Figure 1:
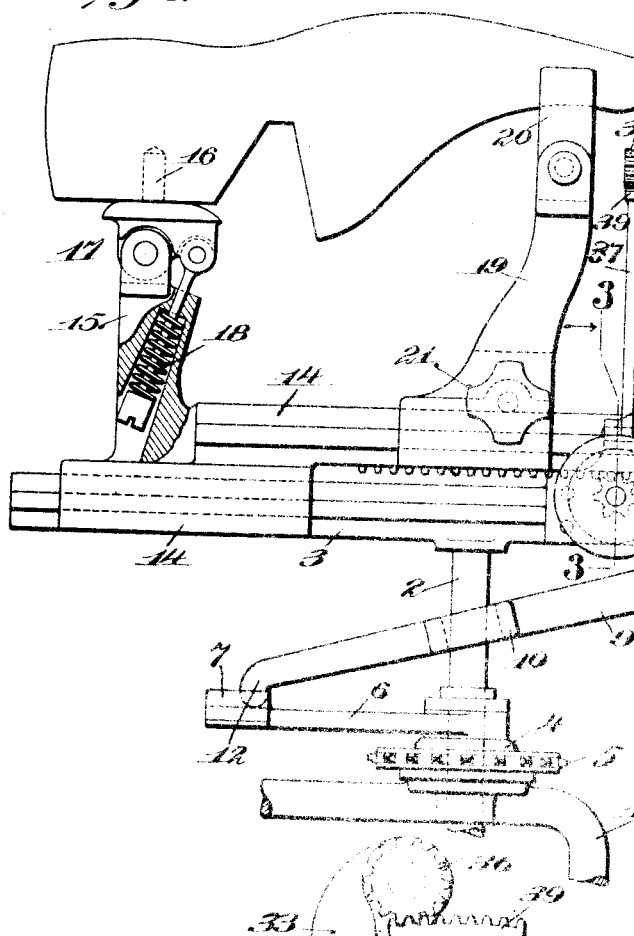

E. E. WINKLEY.
WORK SUPPORT.
APPLICATION FILED AUG. 20, 1908.

1,138,710.

Patented May 11, 1915.
2 SHEETS—SHEET 1.

Witnesses
E. C. Wurdeman
Warren G. Ogden

Inventor:
Erastus E. Winkley
by his Attorneys
Philip Van Everen

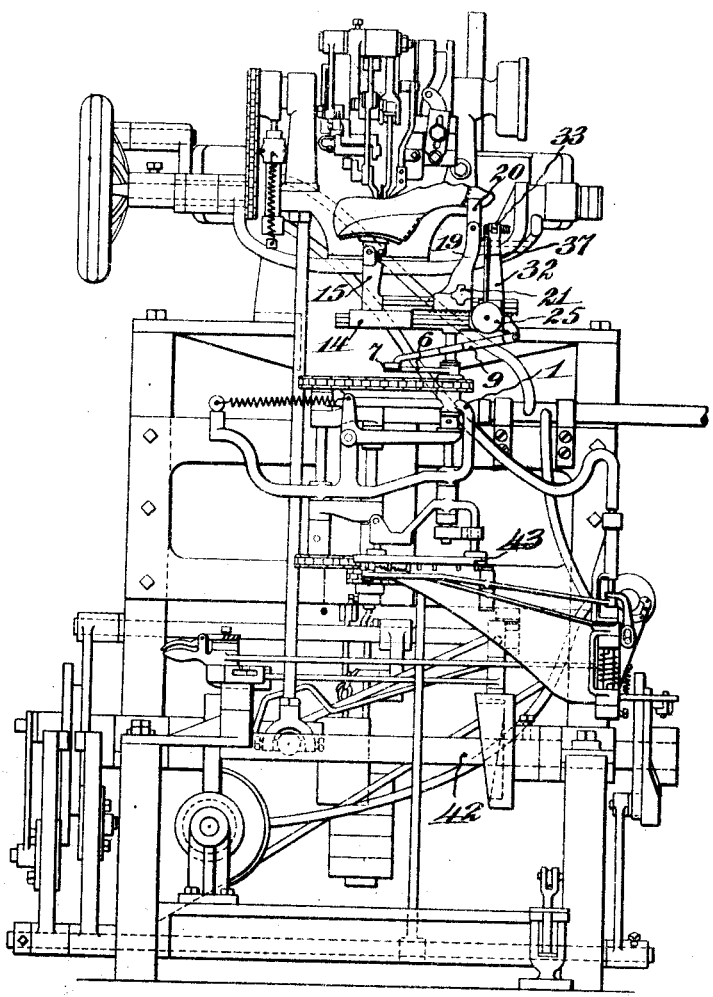

UNITED STATES PATENT OFFICE.

ERASTUS E. WINKLEY, OF LYNN, MASSACHUSETTS.

WORK-SUPPORT.

1,138,710.  Specification of Letters Patent.  Patented May 11, 1915.

Application filed August 20, 1908. Serial No. 449,408.

*To all whom it may concern:*

Be it known that I, ERASTUS E. WINKLEY, citizen of the United States, residing at Lynn, in the county of Essex and State of Massachusetts, have invented certain new and useful Improvements in Work-Supports; and I do hereby declare the following to be a full, clear, and exact description of the invention such as will enable others skilled in the art to which it appertains to make and use the same.

This invention relates to work supports for shoe machinery and more particularly to work supports for automatic shoe machinery.

In automatic shoe machinery, that is, where a shoe, or part of a shoe, in process is placed in the machine and the desired operation is then performed without any manipulation of the work on the part of the operator during the progress of the operation, the relative position of the work and the operating tool as the operation progresses is ordinarily controlled by a correcting mechanism usually either a pattern, a cam, a series of cams, or equivalent mechanical device. In operating on the shoe a particular point in the line of operation, which point may vary according to the nature of the operation to be performed, is selected as a starting point and the tool and work support, after the operation is completed, are ordinarily replaced in the relative positions they occupy when starting the operation in order to properly position the machine parts for the commencement of the operation on the next shoe. In this class of machinery, therefore, it is only necessary for the operator to initially position the shoe or other work and then start the machine in operation.

It is obvious that the correcting mechanism must have a definite relation to the tool during the operation of the machine in order to properly perform its function. All points on the correcting mechanism are, therefore, during such operation in definite relation to the tool. If, then, the work is initially positioned in the machine with any selected point in the line of operation placed in the same relation to the tool as the corresponding point on the correcting mechanism, it follows that the desired change in relative position of the tool and work throughout the operation will necessarily be obtained owing to the control of this movement by the correcting mechanism.

The principal object of this invention is to provide means, arranged in fixed relation to a definite point on the machine whose relation to the tool during the operation of the machine is known, for locating the work in a selected starting position relative to the tool.

Another object of the invention is to provide work positioning means which is normally held in inoperative position but which is automatically placed in operative position at and during the time it is desired to position the work relatively thereto.

In the preferred form of the invention these objects are attained by the provision of a stop or index mounted on the frame of the work support, and the further provision of means for moving the work bodily relatively to said stop or index to permit the location in proper working relation to the tool of the same selected starting point in the line of operation, on varying sizes of shoes or parts of shoes. This stop or index is normally in inoperative position and preferably its movement into operative position is controlled by the same devices which control the movement of the work relatively to the stop or index.

To the accomplishment of these objects, and such others as may hereinafter appear as will be readily understood by those skilled in the art, the invention comprises the features and combinations of parts hereinafter described and particularly pointed out in the appended claims.

The preferred form of the invention is illustrated in the accompanying drawings in which—

Figure 2:
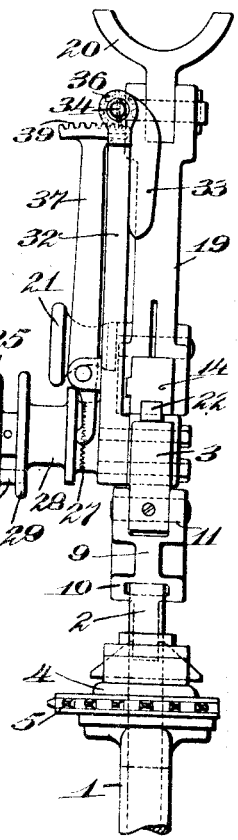
Figure 4:
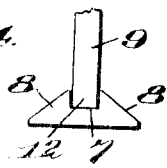
Figure 3:
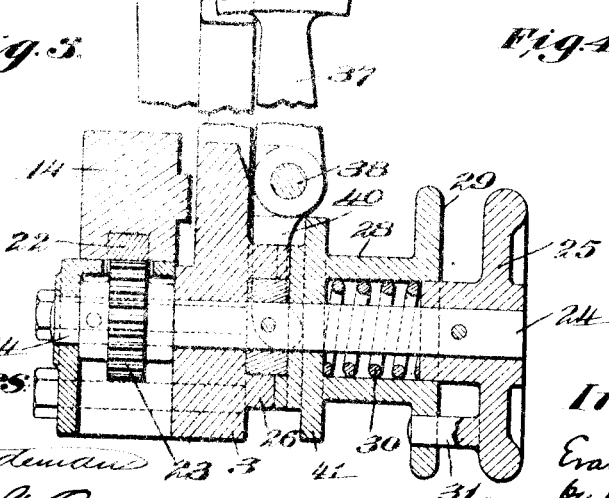

Figure 1 is a side elevation of the work support, showing its connection to the power means for rotating it. Fig. 2 is an end elevation of the parts shown in Fig. 1, Fig. 3 is a detail in section on the line 3—3 of Fig. 1, Fig. 4 is a detail to be referred to hereinafter, and Fig. 5 is a front elevation of a complete automatic shoe machine embodying the present invention.

In the embodiment of the invention illustrated in the drawing, 1 is a portion of an arm which sustains the work support. A spindle 2 is loosely journaled vertically in the arm 1 so that it may slide and turn therein and sustains at its upper end the base portion 3 of the work support. A sleeve 4, on which is mounted a sprocket wheel 5, is loosely carried by the spindle 2 just above the bracket 1 and a suitable sprocket chain (see Fig. 5) driven by any suitable power means is passed around said sprocket wheel. Above the sleeve 4 and loosely journaled on the spindle 2 is a crank arm 6. This crank arm is rigidly connected to the sleeve 4 in any convenient manner. The crank arm is provided at its free end with a short guide-way 7 having sloping approach sides 8, as shown in Fig. 4. A lever 9, provided with a centrally arranged perforated boss 10, is fulcrumed by its upper end at 11 to the base portion 3 of the work support. Its lower end 12 is down-turned and rests in the guide-way 7 of the crank arm 6 forming a sliding connection at this point. A spring pressed plug 13 is mounted in the base portion 3 of the work support and is arranged to bear on the upper side of the lever 9, thereby holding the free end 12 of the lever in contact with the guide-way at the free end of the crank arm. With this construction, as the sleeve 4 is rotated by means of the power driven sprocket it carries with it the crank arm 6 which, in turn, imparts a rotary movement to the lever 9 and the work support. If, for any reason, it is found desirable to break the connection between the work support and the power means for rotating it, it is only necessary for the operator to lift the lever 9 against the force of the spring pressed plug 13 sufficiently to release the end 12 of the lever from its guide-way 7. The work support may then be rotated freely by the operator about its spindle 2 as a center, independently of the power means for driving it.

Contact of the inner surface of the perforated boss 10 with the spindle 2 serves to limit the downward movement of the lever 9 after its free end has been removed from the guide-way 7. The parts are so proportioned that the free end of the lever is not permitted to fall below the level of the sloping approaches 8 at each side of the guide-way. With this arrangement, when the operator desires to again connect the work support with the power means for rotating it, it is only necessary to rotate the support in a direction to bring the end 12 of the lever 9 into contact with one or the other of the sloping approach surfaces 8. After contact with one of these sloping surfaces continued rotation will cause the lever to be lifted against the force of the spring pressed plug 13 until it is brought over the guide-way 7, when said plug will immediately force it down into said guide-way, thus automatically again making connection between the work support and the power means.

Mounted on the base portion 3 of the work support is a work holder herein shown as a jack of the saddle and spindle type. The frame 14 of this jack is slidably mounted on the base portion 3 of the work support, for the purpose to be hereinafter described. Rising from said frame is a heel post 15 provided with a last pin 16 pivoted on the heel post at 17 and drawn forward by a spring 18 as is usual. A toe post 19, provided with a saddle 20, is mounted on the frame 14 and is adjustable toward and from the heel post 15 to accommodate shoes of different lengths. A clamping screw 21 holds the toe post in place.

To the end that the entire work holder may be adjusted to different positions on the work support base portion 3, the frame 14 is provided with a rack 22 which meshes with a pinion 23 pinned to a spindle 24 journaled in said base portion 3 and provided on its outer end with a hand wheel 25. A boss 26, projecting from the base portion 3 and surrounding the spindle 24, is provided with teeth 27 (see Fig. 2). A locking sleeve 28 having a finger disk 29 is mounted on the spindle 24 and is counterbored for the reception of a coil spring 30 which surrounds the spindle and bears at one end against the hand wheel 25 and its other end against the inner surface of the sleeve 28. The sleeve 28 is provided on its inner face with teeth corresponding in size to the teeth 27. A pin 31 projecting from the hand wheel 25 and through a hole in the finger disk 29 of the sleeve 28 constrains the sleeve to rotate with the hand wheel about the spindle and prevents any independent rotation of said sleeve.

In adjusting the work holder on the base portion of the work support, the operator first grasps the hand wheel 25 with his fingers about the locking sleeve 28 and inside of the finger disk 29. He then draws the sleeve toward the hand wheel against the force of the spring 30 and thus releases the engagement of the teeth of the sleeve with the teeth 27. This unlocks the spindle 24 and permits its free rotation by means of the hand wheel 25. A rotation of the spindle, in turn, rotates the pinion 23 and causes a movement of the rack 22 and the frame 14, thus sliding the frame and the work holder carried thereby longitudinally of the base portion of the work support.

Fixedly mounted at the forward end of the base portion 3 of the work support is a work positioning device comprising an upright arm 32 having at its upper end a work locating stop 33. This stop is fulcrumed on a horizontal pivot pin 34 and may be moved about its fulcrum into operative or inoperative position relative to the work. A coiled spring 35 is wound around the fulcrum pin 34 and is secured in such manner that it acts to continually force the work locating stop into its operative position.

which is the position shown by dot and dash lines in Fig. 1. The fulcrum pin 34 is also provided with a small pinion 36. A lever 37 is fulcrumed at 38 on the upright 32 and is provided at its upper end with a segment 39 meshing with the pinion 36. A portion 40 of this lever extends a short distance below its fulcrum 38 and bears against a collar 41 formed on the locking sleeve 28.

The spring 30 within the locking sleeve 28 is stronger than the spring 35 for maintaining the work locating stop 33 in its operative position and, therefore, when the sleeve is in locking position, which is its normal position, it acts on the lever 37 in such manner as to cause a movement of the lever to the right, (Fig. 3), and, therefore, a rotation of the pinion 36 in a direction to turn the work locating stop 33 down into its inoperative position (see Figs. 2 and 3). As soon, however, as the operator unlocks the work holder to adjust said holder, the release of the pressure of the locking sleeve on the lower end 40 of the lever 37 permits the spring 35 to turn the work locating stop up into its operative position. Thus the sleeve 28 constitutes a combined work holder locking device and work locating stop controlling device and is a single means for releasing and permitting positioning movements of both the work holder and the work locating stop.

In the use of the work support, the jack frame 14 is first moved away from the work positioning device 32—33, and the toe post is then properly positioned relative to the heel post for the size of shoe to be operated upon. The shoe is then jacked in the usual manner. The operator then disconnects the locking sleeve 28 from the boss 26 in the manner described, which movement causes the work locating stop to be thrown up into its operative position. With the locking sleeve still held out of its locking position, the handle 25 is turned in a direction to move the work holder toward the work locating stop and this movement is continued until the shoe contacts with said stop. The locking sleeve 28 is then released and the two sets of teeth engage, thus locking the work holder in its adjusted position and at the same time, by the action of the locking sleeve and the connections to the work locating stop, the stop is moved down into its inoperative position where it will not interfere with the operation to be performed on the shoe.

The work support and work locating stop has been illustrated and described as applied to the type of automatic shoe machine illustrated and described in Letters Patent of Great Britain granted to A. J. Boult, No. 14,139, dated July 8, 1905. The correcting mechanism in the patent to Boult and in the machine of the drawings consists of three cams carried by a cam shaft. This correcting cam shaft is shown at 42 in Fig. 5 and is operated at intervals to impart the several relative correcting movements to the tool and work which occur when certain points of the shoe are reached in the course of operation thereon. The time of operation of the correcting mechanism is controlled by a controller 43 all as in the patent to Boult.

Although the invention has been shown and described in connection with the use of a jack and a positioning device located so as to bring the toe of the shoe on the jack in contact therewith, it should be understood that the invention is not limited to this construction or arrangement of the parts. The invention is directed broadly to a work holder for supporting either an entire shoe, or any part of a shoe, for instance, the sole of a shoe, and the work locating stop may be at the toe, heel, shank or, in fact, in any desired relation to the shoe which may be found most convenient for the particular operation to be performed. Whatever position is selected for the work positioning device, however, must be selected with due regard to the correcting mechanism which controls the relative change in position between the work and the tool hereinbefore referred to. The correcting mechanism has a definite relation to the tool during the operation of the machine and, therefore, if the work positioning device is located on the work support in a definite location with respect to a selected point on the correcting mechanism, for instance, the point on the correcting mechanism which corrects the relative position of the work and tool during the operation of the tool at the toe of the shoe, then, of course, the relative movement between the work and work positioning device must be such as to bring the toe of the work to the work locating stop. If the point selected on the correcting mechanism with respect to which the work positioning device is located corrects the relative position of the work and tool during the operation of the tool at the heel or shank of the shoe, then the relative movement between the shoe and the work positioning device must be such as to bring the heel or shank to the work locating stop. One point on the shoe having been positioned in a definite relation to the correcting mechanism by means of the work positioning device, it follows that all points on the shoe will be properly presented to the tool during the automatic operation of the machine for the reason that the change in relative position between the shoe and the tool during such operation of the machine is governed by the correcting mechanism.

While the particulars of construction herein set forth are well suited to one form of the invention, it is not to be understood that these particulars are essential since they may be variously modified within the skill of the artisan without departing from the true scope of the actual invention as defined by the following claims.

What is claimed as new, is:—

1. A work support for automatic shoe machinery, having, in combination, a work holder and a work positioning device relatively movable in a direction to cause the work to engage said device and to place the work in working position in the machine, said device having a work locating stop normally in inoperative position, and means for automatically placing said stop in operative position during the relative approach movement of the work and work positioning device.

2. A work support for automatic shoe machinery, having, in combination, a work holder and a work positioning device having a work locating stop, said holder and device being relatively movable to place the work on said holder in working position in the machine, and means for moving said stop into and out of operative position during the positioning operation.

3. A work support for automatic shoe machinery, having, in combination, a base portion, a work positioning device fixedly mounted on said base having a movable work locating stop, means for holding said stop in inoperative position, actuating means for said stop, a work holder movably mounted on said base, means for positioning said work holder relatively to said device, means for locking said work holder positioning means against movement, and a single means for releasing said work holder positioning means from the action of said locking means and permitting positioning movements of both the work holder and work locating stop.

4. A work support for automatic shoe machinery, having, in combination, a movably mounted work holder, a fixedly mounted work positioning device having a work locating stop movable into and out of operative position, actuating means for adjusting said work holder relatively to said positioning device and for moving said stop, and a combined work holder locking device and work locating stop controlling device connected with said actuating means, whereby the stop is placed in inoperative position when the work holder is locked against adjustment and in operative position during the adjusting operation.

5. A work support for automatic shoe machinery, having, in combination, a base portion, a work holder movably mounted thereon, an actuating device for said holder, a work positioning device fixedly mounted on said base having a work locating stop movable into and out of operative position, a controller for governing the position of said stop mounted on and operable with the actuator for the work holder, and operative connections between said stop and controller.

6. A work support for automatic shoe machinery, having, in combination, a movable work holder, actuating means therefor including an operating spindle, a locking device slidingly mounted on said spindle and normally held in locking position, a work positioning device having a work locating stop movable into and out of operative position, means for holding said stop in operative position, and actuating mechanism between the stop and locking device constructed and arranged hold the stop in inoperative position when the locking device is in locking position.

7. A work support for automatic shoe machinery, having, in combination, a work positioning device having a work locating stop fulcrumed thereon, a spring arranged to hold said stop in operative position, a pinion on the fulcrum of said stop, a lever having a rack at one end meshing with said pinion, a work holder movable relatively to said positioning device, and a locking device for said work holder normally held in locking position and acting on said lever in a manner to hold the stop normally in inoperative position, whereby a release of the work holder permits the stop spring to move its stop into operative position.

8. The combination in an automatic shoe machine of a supporting frame, a spindle carried in said frame, a work support mounted on said spindle, and power means for rotating said spindle and support including a crank arm, and a connection between said support and crank arm comprising a lever having one end pivoted to one of said parts and its other end held in sliding engagement with the other of said parts, thereby permitting a release of the support from its engagement with the power means at the will of the operator.

9. The combination in an automatic shoe machine, of a tool, mechanism for automatically correcting the relative position of the tool and the work, a work support having a work positioning device in fixed relation to the correcting mechanism, and a work holder in said work support movable relatively to said device, whereby the work may be located in a selected starting position relatively to the correcting mechanism.

10. A work support for automatic shoe machinery, having, in combination, a movable work holder, and an independently mounted positioning device incapable of movement with the work holder coöperating therewith, said device being normally in inoperative position and adapted to be moved into operative position at the will of the operator to be engaged by the work on said holder on being brought toward the device, and determine the initial position of the work in the machine and to be returned to inoperative position after the initial position of the work has been determined.

11. A work support for automatic shoe machinery, having, in combination, a jack for supporting a shoe bottom up, and a shoe positioning device normally below the plane of the shoe bottom and adapted to be moved upward into the plane of the shoe bottom to coöperate with the jack in positioning the shoe.

12. A work support for automatic shoe machinery, having, in combination, a base portion, a work holder movably mounted on said base portion, and a fixed work positioning device coöperating with the work holder normally in inoperative position and adapted to be moved into operative position while the holder is being moved to position the work thereon by an engagement of the work with said device.

13. A work support for automatic shoe machinery, having, in combination, a movable work holder, and a positioning finger coöperating therewith normally in inoperative position and adapted to be moved in a vertical plane into position to be engaged by the work on said holder on being brought toward said finger, and determine the initial position of the work in the machine.

In testimony whereof I affix my signature, in presence of two witnesses.

ERASTUS E. WINKLEY.

Witnesses:
WARREN G. OGDEN,
ANNIE C. RICHARDSON.